United States Patent [19]

Lewis

[11] 4,257,143
[45] Mar. 24, 1981

[54] POULTRY DECAPITATING APPARATUS
[76] Inventor: Eugene J. Lewis, Rt. #1, Box 306, Demorest, Ga. 30536
[21] Appl. No.: 57,860
[22] Filed: Jul. 16, 1979
[51] Int. Cl.³ .............................................. A22C 21/00
[52] U.S. Cl. ...................................................... 17/12
[58] Field of Search .............................. 17/12, 45, 51
[56] References Cited
U.S. PATENT DOCUMENTS

| 3,477,092 | 11/1969 | Simmons | 17/45 X |
| 3,490,092 | 1/1970 | Harrison | 17/12 X |

Primary Examiner—Willie G. Abercrombie
Attorney, Agent, or Firm—Beveridge, DeGrandi, Kline & Lunsford

[57] ABSTRACT

An apparatus for removing the heads of poultry wherein the birds, each pendulously supported by its feet from shackles connected at intervals to an overhead conveyor, are delivered to place their heads below a neck engaging channel through which the necks pass, the channel being formed by two rods in juxtaposition alongside one another aligned to establish a horizontal divergence between the channel and the conveyor path between entrance and exit ends of the channel. A cutter blade at the exit end of the neck engaging channel is rotated in a vertically oriented plane extending along the axis of the channel. A deflecting guide is located between the exit and entrance ends of the neck engaging channel and adapted to contact and deflect the shackled leg ends of the suspended poultry from a normal path vertically below the path of the conveyor to a deflected path sufficiently offset horizontally from the normal path in a direction opposite that of the neck engaging channel as will withdraw all portions of the bird from within the channel except the neck with the head captured against the lower surfaces of the rods in which position the neck and head continue to be maintained by the weight of the bird suspended from the conveyor with its center of gravity moving along a path between the diverging paths of the conveyor and neck guide channel as the neck aligned transversely of the channel moves into the vertically oriented plane of the cutter blade.

7 Claims, 6 Drawing Figures

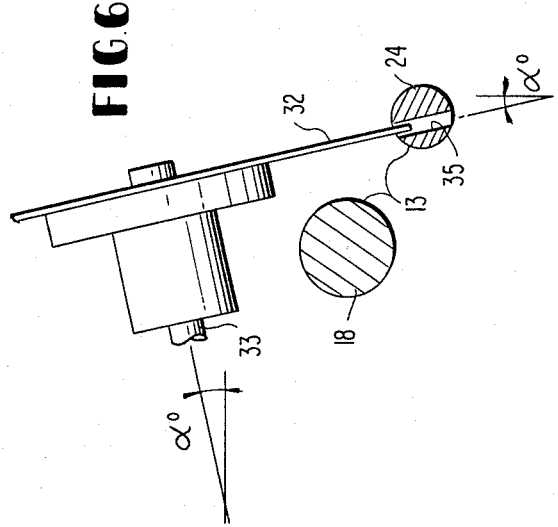
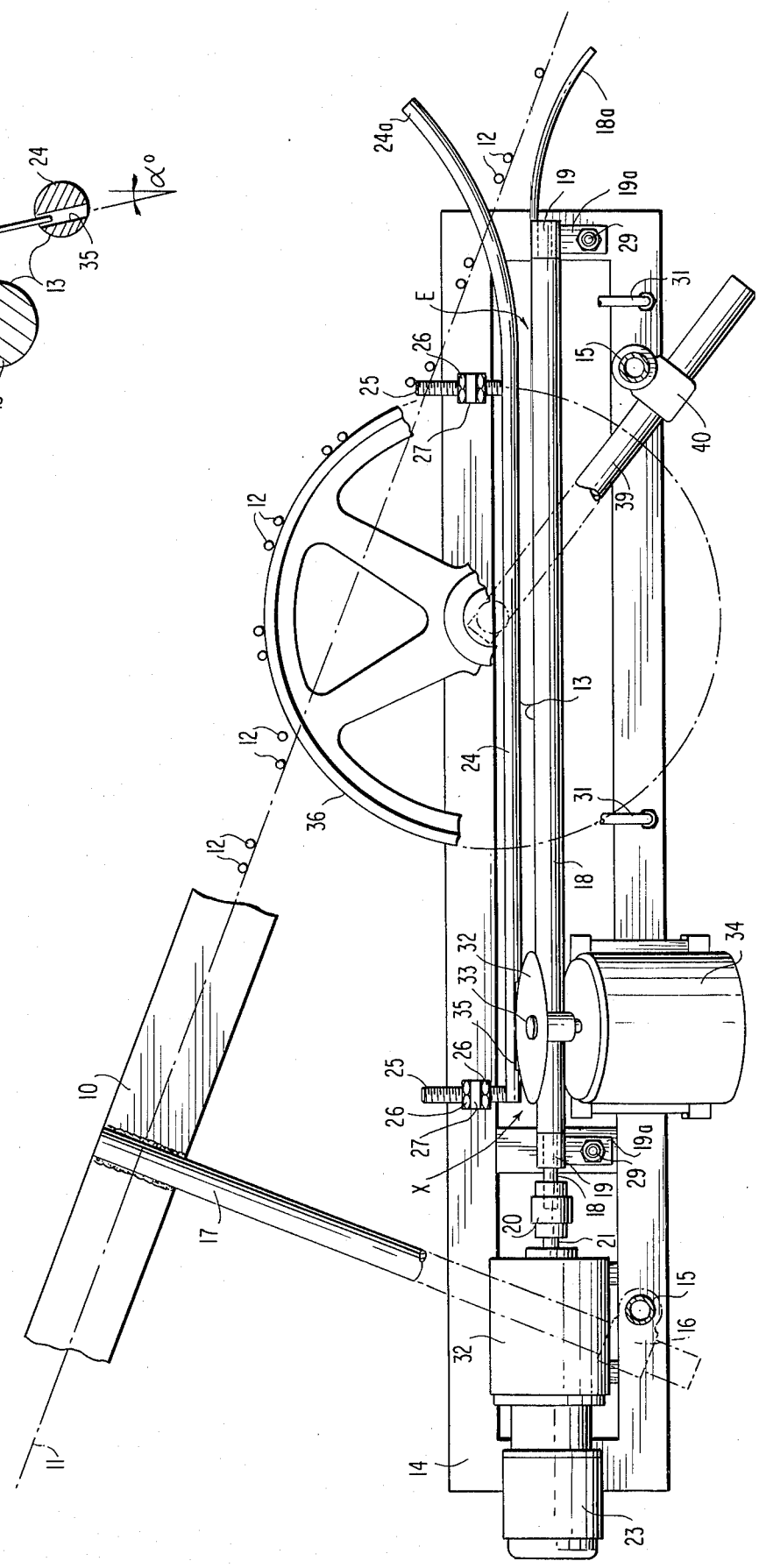

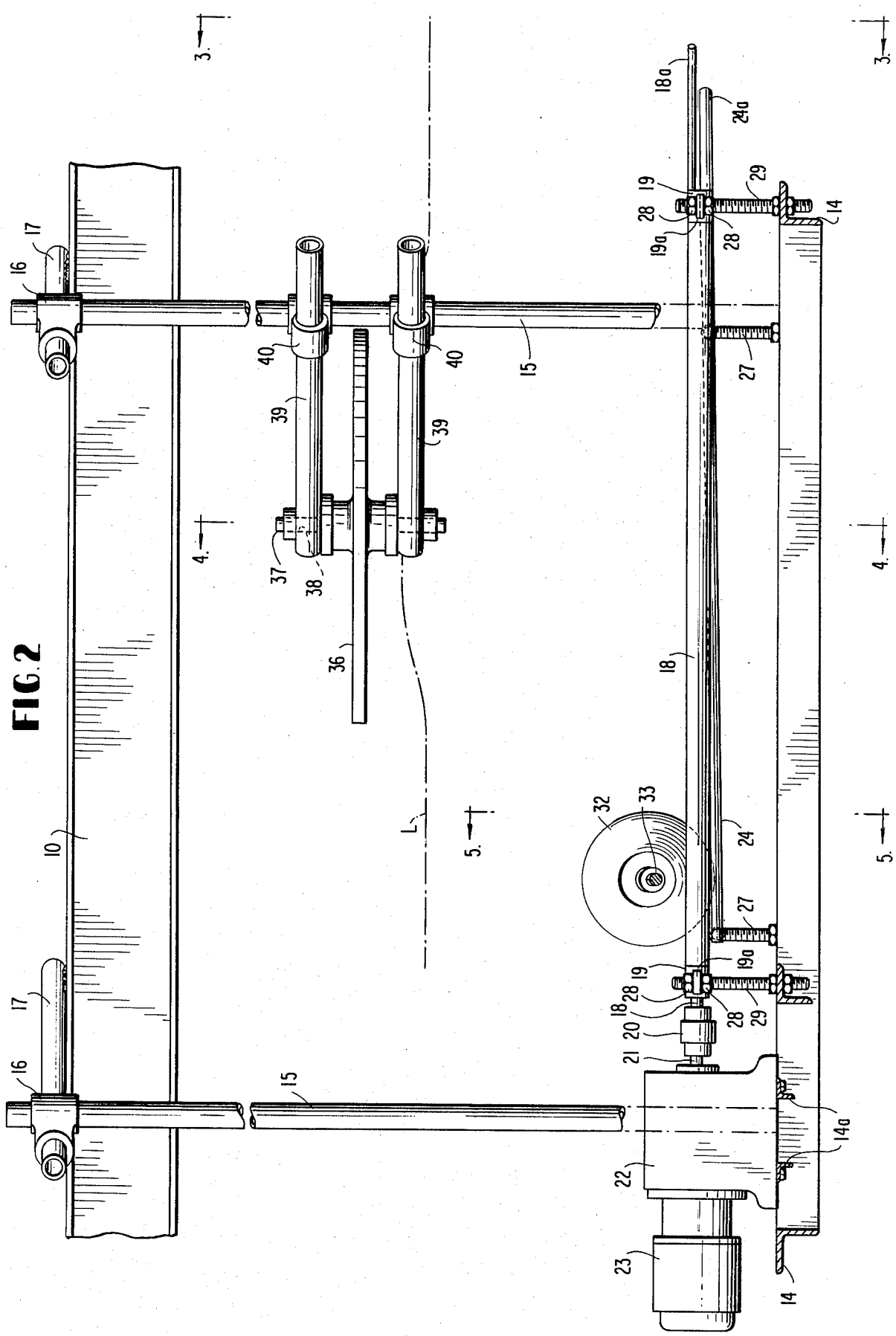

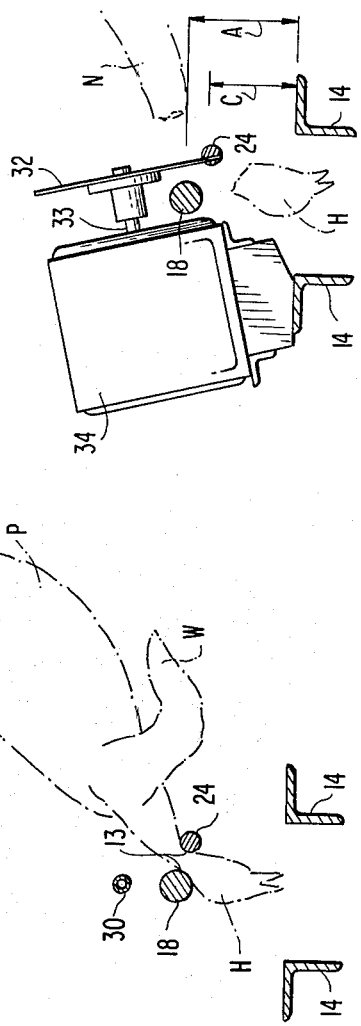
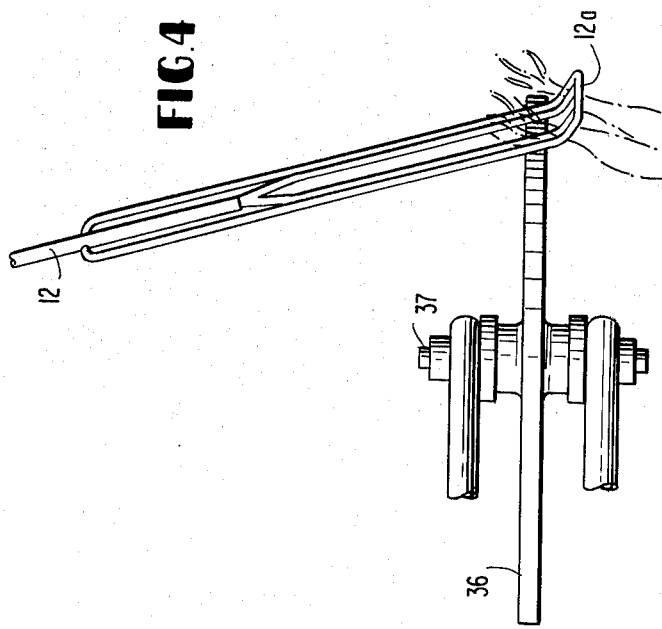
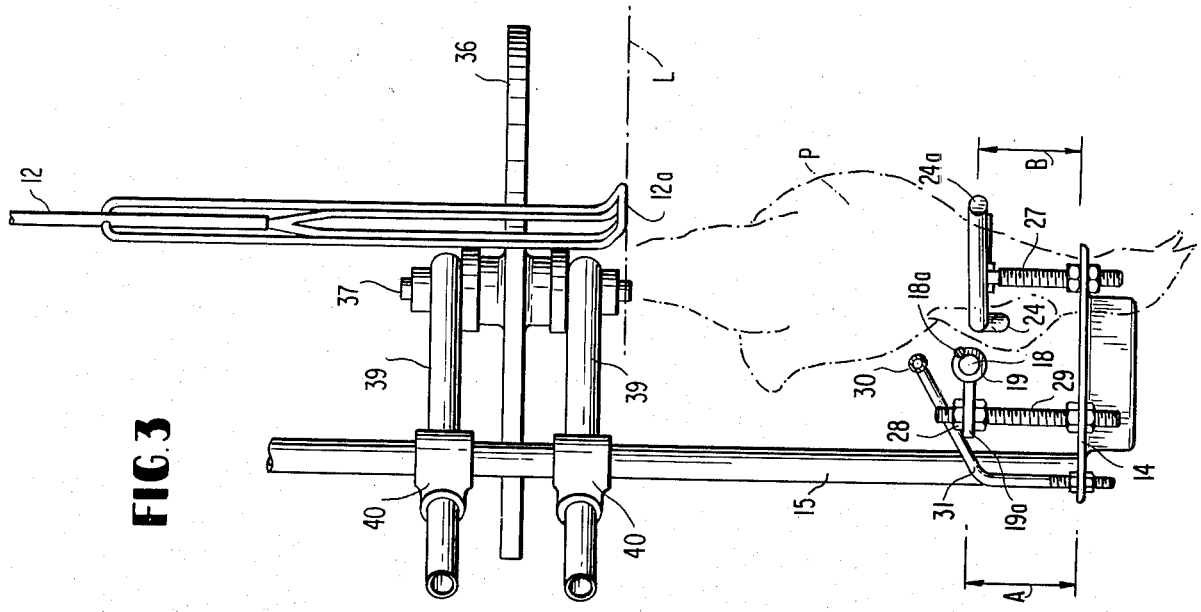

POULTRY DECAPITATING APPARATUS

BACKGROUND

The present invention relates to an apparatus for processing poultry in which the heads are cleanly severed from the necks at an optimum position in a manner to leave the maximum amount of feather free skin on the necks of the birds without damage to the neck and skin.

Mechanization is utilized to the maximum degree in processing poultry for the market. The birds are normally processed for removal of the feathers, head and other portions while pendulously supported by their feet or legs from shackles that are connected at intervals along an overhead conveyor. Devices of various types have been utilized for automatically removing the heads of the birds as they pass down the processing line. Some of these devices behead the bird by physically pulling the head from the body to obtain separation by a tearing action, of which the devices of U.S. Pat. Nos. 3,737,948 and 3,956,794 are typical. Devices of this type are not too satisfactory since the heads are not always cleanly severed from the neck at the optimum point immediately adjacent the skull. It is generally desirable to sever the head from the bird immediately adjacent the skull so as to leave a maximum amount of neck material, including neck skin, on the body of the decapitated bird. In order to control more closely the point of severance of the head from the neck and maintain a maximum amount of neck material on the body of the bird after the head is severed, other devices move the bird along a processing line to bring the neck of the bird into the path of a rotating cutting blade. Devices of this type commonly employ a neck capturing channel comprising horizontally spaced-apart members that capture the neck and head of the bird and then guide the neck into the path of a cutting blade that is rotating in a horizontal plane immediately above the guide members. Typical of this type of apparatus are the devices shown in U.S. Pat. No. 2,924,846, U.S. Pat. No. 3,017,660 and U.S. Pat. No 3,514,809. Although the neck of the bird is usually severed quite close to the skull by devices of the nature of the one illustrated in U.S. Pat. No. 2,924,846, the angle at which the neck is cut varies according to the degree of retardation which varies with neck size and length of the bird. Such devices do not provide the desired degree of consistency in severing the head from the neck as will leave a maximum amount of neck and neck skin on the bird and the point of severance cannot be well controlled. Whereas the rotating helix of the device in U.S. Pat. No. 3,514,809 does tend to pull the skin away from the head and assists in maintaining a maximum amount of skin on the neck of the beheaded bird, contact with the rotating helix tends to bruise and damage the neck of the bird and the device does not cleanly sever heads from the necks of birds of different length at the same optimum point. In the device of this patent the head of a long bird will hang considerably below the level of a head of a short bird. Thus when a long bird enters the neck guiding channel the rotating helix will have to lift the head of the vertically hanging bird a cosiderably greater vertical distance than a shorter bird to bring the heads into contact with the bottom edge of the neck guiding channel which has a tendency to bruise the necks of the long birds which are forced into an S shape as they approach the cutter and does not provide a clean cut. Further, the wings of the longer birds will hang down and become engaged in the helix and cutter and the helix tends to cause the severed heads to clog in the apparatus.

SUMMARY

The present invention utilizes a generally vertically aligned cutting blade, rather than a horizontally aligned one as in the prior art, and utilizes the weight of the bird which is offset horizontally from the position of the captured head and neck in causing the neck and head to move into an optimum position within a neck engaging channel at the time the neck is brought into alignment to extend transversely across the path of the vertically oriented cutting blade. This is accomplished by providing a neck engaging channel comprising two rods spaced a short distance apart in juxtaposition alongside one another below the conveyor and aligned such that the neck channel diverges horizontally from the path of an overhead conveyor to which the shackles are attached from which the birds are suspended, the neck channel rods being spaced apart a distance that the necks of the birds will pass through but the heads will not. Preferably the rod most remote from the path of the conveyor is rotated and the axes of the respective rods are aligned such that they are at substantially the same horizontal level at the entrance end of the neck guiding channel but with the axis of the rod closest the conveyor path diverging vertically downwardly from the axis of the other rod at a small acute angle. A rotatable cutter blade is mounted at the exit end of the channel to rotate in a vertically oriented plane extending along the axis of the neck engaging channel. A deflector guide is located between the exit and extrance ends of the neck channel defining rods in a position to contact and divert the shackled upper ends of the birds suspended from the conveyor from a normal path hanging vertically below the conveyor path to a displaced path that is sufficiently offset horizontally from the normal path in a direction opposite the rods that all portions of the birds except the neck and head are withdrawn from within the channel between the rods and the head is maintained tightly wedged against the lower surface of the rods by the weight of the body of the bird that is hanging between the conveyor and the neck guiding rods in a direction generally perpendicular to the plane of rotation of the cutter blade with the center of gravity of the bird moving along a path horizontally offset from the channel in which the neck and head are captured. The rotation of the one rod tends to cause the neck of the bird to pass more freely along the guiding channel and if rotated in one direction will cause a maximum amount of skin to be retained on the neck of the bird and if rotated in the other direction can cause the neck of the bird to be positioned such that the cutter severs the neck at a point below any feathers that might not have been removed from adjacent the head of the bird.

An object of this invention is to provide an apparatus for removing heads from poultry in a processing line in which the heads are removed cleanly from the neck at an optimum position for retaining a maximum amount of clean, feather free, unbruised and undamaged neck and skin.

Another object of the invention is to provide an apparatus for cleanly removing poultry heads from the necks at the same predetermined location regardless of any variation in poultry length.

A further object of the invention is to provide an apparatus for severing the heads of birds pendulously suspended from a conveyor processing line in a manner that the wings are protected from damage.

Yet still another object of the invention is to provide a simple and economical apparatus for decapitating poultry in a manner to retain a maximum amount of undamaged neck and neck skin.

DRAWINGS

A preferred embodiment of the invention can be best understood by reference to the following description taken in connection with the accompanying drawings in which:

FIG. 1 is a plan view of a preferred embodiment of the invention with portions of the device omitted for clarity.

FIG. 2 is a side elevation of the device of FIG. 1 also with some sections omitted for clarity.

FIG. 3 is a cross sectional view along section line 3—3 of FIG. 2 with certain portions of the structure omitted for clarity.

FIG. 4 is a partial cross sectional view taken along section line 4—4 of FIG. 2.

FIG. 5 is a cross sectional view of a portion of the structure taken along section line 5—5 of FIG. 2.

FIG. 6 is an enlarged view of a portion of FIG. 5.

DESCRIPTION OF A PREFERRED EMBODIMENT

Most modern poultry processing plants utilize a system of overhead conveyors for transporting the poultry through the various operations that are involved from the time the poultry is killed until it is packaged for delivery to the ultimate consumer. The typical conveyor comprises an overhead chain type conveyor supported from a beam with elongated shackles having their upper ends pivotally connected at intervals along the length of the chain conveyor and the lower ends of the shackles engaging the feet of the poultry which are pendulously suspended in a freely hanging position below the conveyor as it moves along the processing path. Portions of such a conveyor are illustrated in FIGS. 1-4 in which the overhead beam 10 supports the moving elements of the endless conveyor, such as chain links, (not illustrated) that are moved along the conveying path 11 and to which the upper end of the poultry suspending shackles 12 are pivotaly connected at intervals for movement along the conveyor path 11. The lower end 12a of each shackle is configured to retainingly hold the feet to a bird P which is pendulously supported from and normally hangs freely in a freely suspended condition below the shackle and conveyor.

In the illustrated embodiment, the decapitating apparatus is supported on the frame 14 comprising L beams arranged in the form of a hollow rectangle which in turn is supported from the overhead conveyor beam 10 by a pair of vertical stanchions 15 of which the lower ends are affixed to the frame 14 at opposite ends thereof and the upper ends of each are slidably connected by pipe fittings 16 to horizontally extending stanchions 17 that are welded onto the conveyor beam 10. As can be best seen in FIG. 1, the frame 14 is aligned such that its longitudinal axis and the line of the conveyor path 11 define an acute angle. The respective end portions of an elongated rod 18 are rotatably supported above the top surface of the frame 14 in bearings 19 which are supported for vertical adjustment from transverse segments of the frame 14 by bearing extension 19a contained between threaded connectors 28 threaded onto vertically extending threaded supports 29. The end of the rod 18 farthermost from the end of the frame 14 converging with the conveyor beam 10 is connected by a conventional fitting 20 to the output shaft 21 of a reduction gear assembly 22 driven by the motor 23 mounted on the frame 14, by the transversely extending support bars 14a.

Another elongated rod 24 of slightly less diameter than the rotatable rod 18 is supported above the frame 14 in juxtaposition alongside the rotatable rod 18 for vertical and horizontal adjustment by horizontally extending supports 25 affixed to the stationary rod 24 near each of its ends and connected by threadable connections 26 to vertically extending supports 27 that are threadably engaged in the frame 14. Preferably the bearings 19 at both ends of the rotating rod 18 may be positioned on the vertical supports 29 to be equally distant above the top surface of the frame 14. The stationary rod 24 preferably may be aligned, by means of its horizontal and vertical threaded supports 25, 27 and threaded connectors 26, such that the end of the stationary rod 24 at the entrance end of the apparatus nearest the conveyor line 18 is at substantially the same horizontal level as the rotating rod 18 with the other end of the stationary rod a little below the horizontal level of the other end of the rotating rod 18 connected to the reduction gearing drive shaft and spaced horizontally from the rotating rod 18 a distance that the necks of poultry will pass along a neck guiding channel 13 defined by the space between the two rods but the heads of the poultry will not with the spacing between the straight segments of the two rods at the entrance end E of the poultry neck guiding channel 13 nearest the conveyor line 11 being slightly greater than the spacing between the two rods at their opposite end portions at the exit end X of the channel 13. The outermost end segment 24a of the stationary rod 24 at the entrance end E of the channel curves away from the center line of the neck channel 13 to establish, in conjunction with an oppositely curving auxiliary extension 18a of the rotatable rod 18 and affixed to the bearing 19 at the free end of the rotating rod 18, a converging entrance into the space between the straight segments of the two rods 18, 24 that form the neck guiding channel 13 to assist in capturing the necks of the birds moved by the conveyor shackles 12 toward the entrance end E of the channel 13. In a typical installation the rotating rod 18 is 1¼ inches in diameter and the stationary rod 24 is ¾ inch in diameter with the length of the straight segment being 34½ inches and the rods are aligned such that the vertical distance A between the frame and the center line at both ends of the rotating rod 18 is 4 inches, the vertical distance B from the frame to the center line of the end of the stationary rod 24 at the entrance end E of the neck guiding channel is 3⅞ inches, the vertical distance C between the top of the frame 14 and the center line of the stationary rod 24 at the channel exit end X is 2⅞ inches and the horizontal clearance between the facing surfaces of the two rods is ¾ inch at the channel entrance end E and ½ inch at the channel exit end X. A spray pipe 30 with perforations along its length and connected to a water supply is supported from the frame 14 by upwardly extending angle support rods 31 to extend along the length of the frame 14 above the rotating rod 18 in a position to spray water onto the poultry being processed. This perforated pipe is not illustrated in FIGS. 1 and 2 so as not to interfere with more essential structure of the device. The spray pipe 30 forms no part of the invention and its purpose is a sanitary one of maintaining a spray of water on the birds as they are carried along the line of the decapitating apparatus to wash away blood and other contamination.

A circular cutter blade 32 is connected to the shaft 33 of a cutter motor 34 that is mounted on the frame 14 immediately adjacent the exit end X of the neck engaging channel 13 with the motor and shaft 33 aligned transversely of the rotating and stationary rods and tilted upwardly from the horizontal at a small acute angle in a manner to align the cutter blade 32 for rotation in a vertically oriented plane extending through the stationary rod 24 along its axis and tilted at a small acute angle to the vertical to pass above the rotating rod 18. The end portion of the stationary rod 24 has a longitudinally extending groove or slot 35 beneath the cutter blade 32 to accommodate the lower portion of the blade rotating within the confines of the stationary rod 24 and closely adjacent the surface of the rotatable rod 18. A suitable angle $\alpha$ at which the motor is tilted upwardly in establishing the angle $\alpha$ at which the plane of the cutter blade 32 is tilted from the vertical could be 12° for the typical apparatus having the rod alignment dimensions A, B and C previously noted.

A horizontally aligned diverting guide wheel 36 is mounted for rotation of its vertically aligned axle 37 rotatably supported in bearings 38 contained in wheel support pipes 39 extending horizontally from pipe fitting 40 that slidably engage the frame supporting vertical 15 nearest the exit end E of the neck engaging channel to position a perimeteral portion of the diverting guide wheel 36 to extend horizontally away from a vertical plane passing through the conveyor path 11 on the opposite side from the frame 14 and neck guiding channel 13 of the rods 18, 24. Since the purpose of the diverting guide wheel 36 is to divert the leg portions of the bird supported in the lower ends 12a of the shackles 12 from a normal path directly beneath the conveyor line 11 to a path displaced horizontally away from the normal path in a direction opposite the rod and cutter motor supporting frame 14, the deflecting wheel 36 need not necessarily be rotatable nor is a wheel necessary. The poultry diverting structure can be any suitable form of deflecting structure which will cause the lower end of the shackles and the supported legs of the birds to be displaced in the manner illustrated and discussed herein.

In processing poultry utilizing the aforesaid described apparatus, the neck N and often the downwardly hanging wing W portions of the birds P, that are being carried along the path 11 of the conveyor in a freely hanging vertical position suspended by their feet from the shackles 12 pivotally connected to the conveyor, enter the space between the curved, entrance end segments 18a and 24a of the neck guiding rods 18, 24 with the head H of the bird below the level of the rods in the manner shown in FIG. 3. As the bird is carried along the conveyor path 11, the lower portions of the bird are brought by curved and converging entering segments 18a and 24a of the neck guiding rods 18, 24 into the neck guiding channel 13 defined between the straight segments of the rods 12, 24 to pass along the path of the channel 13 which diverges from the conveyor path 11 along which the shackles 12 and upper leg portions of the bird are moved by the conveyor. When the lower ends 12a of the shackles 12 and feet of the birds moving along the conveyor 11 come into contact with the perimeter of the diverting guide wheel 36, the shackles pivot outwardly from the wheel axle 37 permitting the lower ends 12a of the shackles and the foot portions of the birds to follow a displaced path defined by the perimeteral portion of the wheel instead of following the normal path vertically below the conveyor path 11. The pivotal motion of the shackle 12 upon contacting the deflecting wheel 36 raises the level of the path L of the lower portion 12a of the shackle and displaces this path L to be horizontally farther from the neck guiding channel 13 than the divergent path 11 of the conveyor, which displacement of the upper portions of the birds and their weight pulls them in a direction transversely of and away from the neck guiding channel 13 such as to free any wings W of birds that might have become entrapped with the necks in the channel 13 between the neck guiding rods and pulls the head H of the birds to bring the skull portion joining the neck closely adjacent the lower surfaces of the neck guiding rods 18, 24 with the neck extending transversely of the channel 13 in the manner illustrated in FIG. 4. As the birds continue to be moved along the processing line with the feet following the conveyor path 11 and the entrapped head following the diverging path of the neck guiding channel 13, the poultry necks and heads continue to be maintained in the optimum position illustrated in FIG. 4 with the base of the skull contiguous to the underside of the neck guiding rods 18, 24 and the neck extending outwardly transversely of the channel 13 generally perpendicular to the plane of the cutter blade 32 of which the center of gravity lies between the diverging paths of the neck guiding channel 13 and the conveyor path 11. Alignment of the neck guiding rods to place the end portion of the stationary rod 24 at the channel exit E below the level of the rotating rod 18 causes the neck portions adjacent the skulls to extend transversely of the channel 13 substantially perpendicular to the vertically oriented plane of the cutter blade such that the head is cleanly severed closely adjacent the skull base and positively displaced downwardly away from the neck guiding channel 13 when reaching the cutter blade. Rotation of the rotatable rod 18 is preferably in a counter clockwise direction as viewed in FIG. 5, the rotation assisting easier movement of the neck along the neck guiding channel 13 and pulling the skin away from the head in a manner to leave a maximum amount of skin on the neck upon severance from the head. Good results have been obtained by rotating the rotatable rod at 420 RPM in a device having the dimensions and rod alignment previously mentioned. However, on occasions wherein feathers were not removed from the neck of the birds adjacent the base of the head, by reversing the direction of rotation of the rod driving motor and the rod 18, the heads tend to be moved downwardly a short distance below the neck guiding rods 18, 24 to position the neck such that the feather containing portions of the neck adjacent the head remain with the severed head. The described device has also been operated without rotating the rotatable rod 18 and, although generally satisfactory, better and more consistent results are achieved and greater amounts of neck and neck skin are retained on the decapitated bird by operating the device to rotate the one rod. Alternately, the rod nearest the conveyor could be mounted and powered for rotation in lieu of mounting the other rod for rotation according to the disclosed embodiment or both rods could be mounted for rotation.

It should also be understood that the spacing and alignment of the rods need not be those indicated for dimensions A, B and C noted herein and the angle α at which the cutter blade is indicated to tilt from a vertical plane need not be that noted herein, these dimensions merely being representative of typical dimensions of one embodiment which produces eminently satisfactory results. It should be understood that modifications of and alternative structures to the one embodiment disclosed herein may be utilized without departing from the spirit and scope of the invention as defined by the appended claims.

I claim:

1. Decapitating apparatus for removing heads of poultry penduously suspended by their feet from vertically hanging shackles suspended at spaced intervals from a conveyor moving along a predetermined path comprising two elongated rods mounted below the level of said shackles in juxtaposition alongside one another in a horizontally spaced-apart relationship with the spacing between said rods being such as to form a poultry neck guiding channel of a width sufficient to pass the poultry necks and insufficient to pass the heads, said rods being aligned such that said conveyor predetermined path diverges horizontally at an acute angle from said channel between an entrance end of said channel adapted to engage the lower portions to include the necks of suspended poultry carried by the conveyor along said predetermined path and a channel exit end at which a first rod closest said conveyor path is at a lower horizontal level than the other of said rods, a cutter blade mounted at said channel exit end for rotation about an axis extending transversely of said rods above said other rod and tilted at a small acute angle to the horizontal such that said blade is rotated in a vertically oriented plane passing beyond said other rod and through said first rod with the lower arc of said blade extending into a slot in said first rod, means for rotating said cutter blade, and diverting guide means between said channel entrance and exit ends contacting and diverting the shackled ends of poultry suspended from said conveyor from a normal path vertically below said conveyor predetermined path to a displaced path sufficiently offset horizontally from said normal path in a direction opposite said channel as will withdraw from within said channel all portions of poultry other than their necks with their heads captured below said rods contiguous to the rod lower surfaces and the necks aligned transversely of said channel and maintain the necks and heads in this position by the weight of the poultry bodies having their centers of gravity horizontally offset transversely of said channel between the diverging paths of said channel and conveyor during movement of the captured portions of the necks along said channel into the vertically oriented plane of movement of said cutter blade severing the heads from the necks.

2. The apparatus of claim 1 wherein said other rod is supported for rotation about its longitudinal axis and said apparatus includes motor means rotating said other rod.

3. The apparatus of claim 1 wherein said rods are substantially at the same horizontal level at said channel entrance end.

4. The apparatus of claim 3 wherein said rods are aligned such that their bottom surfaces are substantially at the same horizontal level at said channel entrance end and the top surface of said rod closest said conveyor path and the lower surface of said other rod are at substantially the same horizontal level at said channel exit end.

5. The apparatus of claim 3 wherein said rods are aligned such that the horizontal clearance between the rods at said entrance end is greater than at said exit end.

6. Decapitating apparatus for removing heads of poultry pendulously suspended by their feet from shackles connected at intervals to a conveyor moving along a predetermined path comprising a first elongated rod mounted for rotation about its longitudinal axis aligned to diverge horizontally at an acute angle from and below said conveyor path, a second elongated rod fixedly mounted in juxtaposition alongside said first rod and spaced horizontally therefrom toward said conveyor path a distance establishing a neck guiding channel between said rods having a width sufficient to pass the necks and insufficient to pass the heads of poultry engaged in and passing along said channel between an entrance end substantially vertically below said conveyor path and an exit end displaced horizontally from said conveyor path, said rods being aligned to be at substantially the same horizontal level at said channel entrance end with said second rod being below the horizontal level of said first rod at said channel exit end, a cutter blade mounted at said channel exit end for rotation about an axis extending transversely of said rods above said other rod in a vertically oriented plane passing through and extending longitudinally of said second rod and tilted at an acute angle to the vertical to pass closely adjacent said first rod, said second rod containing a longitudinally extending slot below said cutter blade axis of rotation in said blade plane of rotation, the lower portion of said blade extending into said slot, motor means for rotating said cutter blade, and diverting guide means between said channel exit and entrance ends adapted to contact and divert the shackled ends of poultry suspended from said conveyor from a normal path vertically below said conveyor path to a displaced path sufficiently offset horizontally from said normal path in the direction opposite said channel as will withdraw from said channel any portions of poultry other than their necks with the heads entrapped below and contiguous to said rods and the necks extending transversely of and out of said channel and maintain the necks and heads in this entrapped position by the weight of the poultry body portions suspended between the diverging paths of said channel and conveyor in a horizontally offset position from the respective heads entrapped in said channel as the neck portions engaged between said vertically diverging rods move along said channel to pass through the vertically oriented path of the cutter blade.

7. The apparatus of claim 6 wherein said cutter blade plane of rotation tilt from the vertical does not exceed 30°.

* * * * *